D. R. TOLIN.
NUT LOCK.
APPLICATION FILED JAN. 27, 1914.

1,116,168.

Patented Nov. 3, 1914.

Witnesses

Inventor
D. R. Tolin,
By Victor J. Evans
Attorney

UNITED STATES PATENT OFFICE.

DAVID ROBERT TOLIN, OF TUNNEL SPRINGS, ALABAMA.

NUT-LOCK.

1,116,168.    Specification of Letters Patent.    Patented Nov. 3, 1914.

Application filed January 27, 1914. Serial No. 814,749.

*To all whom it may concern:*

Be it known that I, DAVID R. TOLIN, a citizen of the United States, residing at Tunnel Springs, in the county of Monroe and State of Alabama, have invented new and useful Improvements in Nut-Locks, of which the following is a specification.

The present invention relates to means for locking a nut against rotation upon a bolt, the primary object of the same being to provide a simple, cheap and efficient device for this purpose which will perform its useful functions without mutilating either the nut or the bolt.

The improvement is primarily adapted for employment in connection with the fish plates or chairs of rail joints, but of course, may be employed with equal efficiency upon other structures, and consists of a washer or plate which is provided with a central opening so that the same may be inserted over the bolt against the fish plate or other structure, both sides of the plate being formed with radially disposed concentrically arranged engaging members or teeth which, when the nut is applied to the bolt, engage with both the inner face of the nut and with the plate or superstructure, and so prevent the rotation of the nut upon the bolt.

I attain the above objects by a simple structure as that illustrated in the accompanying drawings, the device therein shown, however, being necessarily susceptible to all such changes as fall within the scope of the appended claim.

Figure 1:
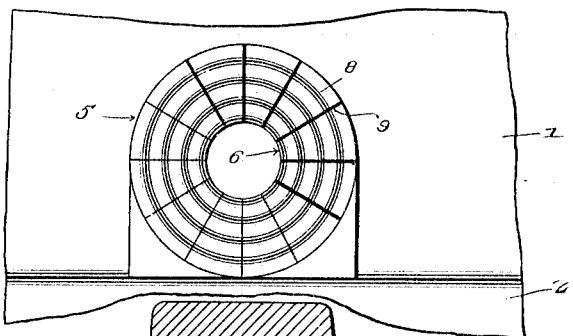
Figure 2:
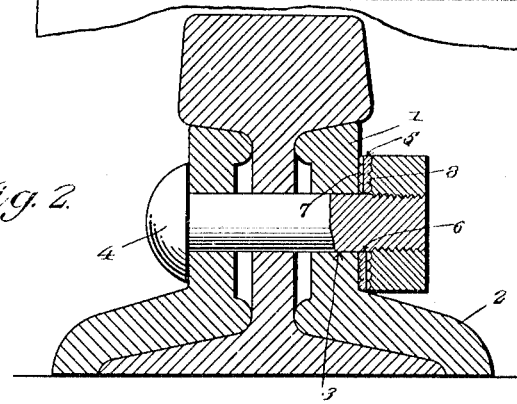
Figure 3:
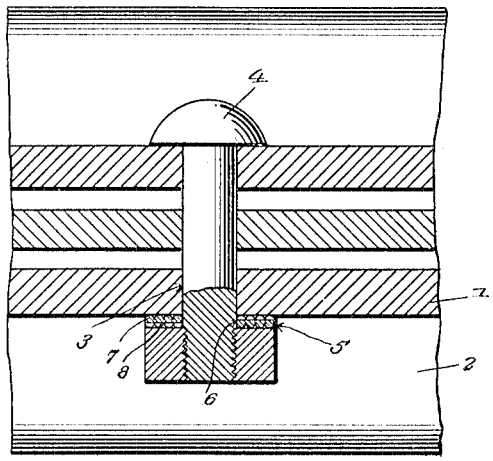
Figure 4:
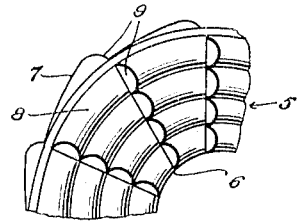
Figure 5:
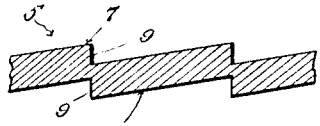

In the said drawing: Figure 1 is front elevation of my improved nut lock showing the same arranged upon a plate or superstructure preparatory to receiving the nut and bolt, Fig. 2 is a transverse sectional view taken through a rail joint in a line with one of the securing bolts and the nut therefor, Fig. 3 is a central horizontal sectional view through the device illustrated in Fig. 2, Fig. 4 is a perspective view of a portion of the nut lock, Fig. 5 is a detail horizontal sectional view taken in a line with one of the series of teeth provided upon my improved nut lock.

Referring now to the drawing in detail, the numeral 1 designates a flanged plate, such as an ordinary angle bar for rail joints, the horizontal portion or flange of the plate being indicated by the numeral 2. The plate is provided with an aperture 3 for the reception of the shank of a bolt 4.

Arranged upon the plate 1 and resting upon the flange 2 thereof is my improved nut lock 5. This lock is constructed of spring steel, and is in the nature of a small plate or washer, the same being provided with an opening 6 through which the shank of the bolt 4 passes, and the washer has its lower end flat or straight so that the same will rest upon the flange 2, while the upper periphery of the washer may be, and preferably is, rounded. The washer 5 has both of its faces formed with engaging members in the nature of teeth 7 and 9, the said teeth at what I will term their biting edges, being disposed at a right angle to each of the faces of the plate, as indicated by the numerals 9, and the teeth are preferably semi-cylindrical at this portion thereof. Each series of teeth gradually diminish in thickness from the portions 9 and merge to within the plate proper at their intersections with the faces 9 of the next succeeding series of teeth. The lateral portions or shoulders 9 of the series upon each of the faces of the plate are disposed diametrically opposite each other, and the bodies of the teeth upon one of the faces of the plate converge or incline in an opposite direction upon the opposite face of the plate, as clearly shown in Figs. 4 and 5 of the drawing, and, as stated, the lock being constructed of spring steel is naturally of a greater strength than the plate with which the series upon one of the faces of the lock engage and with the inner faces of the nut which contacts with the second or opposite face of the lock. The teeth are arranged concentrically in series upon both of the faces of the plate or washer 5, and the teeth upon the outer face of the washer are beveled or inclined in the direction in which the nut is screwed upon the bolt, so that their biting edges will contact with the nut to prevent a retrograde movement of the same.

From the above description, taken in connection with the accompanying drawing, the simplicity of the device as well as the advantages thereof will, it is thought, be perfectly apparent to those skilled in the art to which such invention appertains without further detailed description.

Having thus described the invention, what I claim is:

A nut lock comprising a plate having an opening, the said plate having both of its faces provided with teeth which are arranged circumferentially of the opening, the said teeth having lateral shoulders which are arranged radially with respect to the opening and each of said teeth being substantially of a semi-cylindrical formation, the shoulders of one of the series of teeth on one face being in the same plane as the shoulders of the adjacent series of teeth on the opposite face of the plate, and the teeth inclining gradually from the said shoulders to the plate proper and to the shoulders of the next series of teeth.

In testimony whereof I affix my signature in presence of two witnesses.

DAVID ROBERT TOLIN.

Witnesses:
F. S. DAILEY,
J. J. DAILEY.

Copies of this patent may be obtained for five cents each, by addressing the "Commissioner of Patents, Washington, D. C."